United States Patent [19]

Anderegg

[11] 4,079,604
[45] Mar. 21, 1978

[54] UNIVERSAL ADJUSTABLE PADLOCK MOUNT FOR VEHICLE ACCESSORIES

[76] Inventor: Gary H. Anderegg, 96 Hillcrest Blvd., Ypsilanti, Mich. 48197

[21] Appl. No.: 781,704

[22] Filed: Mar. 28, 1977

[51] Int. Cl.² .............................................. E05B 73/00
[52] U.S. Cl. ........................................ 70/58; 248/285
[58] Field of Search ................. 70/58, 14, 18, 57, 228, 70/229, 258, DIG. 57; 248/27, 203, 289 R, 285; 211/4, 8

[56] References Cited

U.S. PATENT DOCUMENTS

| | | | |
|---|---|---|---|
| 3,410,122 | 11/1968 | Moses ........................................ | 70/58 |
| 3,574,340 | 4/1971 | Busche ................................... | 248/285 |
| 4,024,737 | 5/1977 | McInturff ................................ | 70/58 |
| 4,031,721 | 6/1977 | Anderson .......................... | 248/203 X |
| 4,038,843 | 8/1977 | Daley, Jr. ............................. | 248/203 |

Primary Examiner—Richard E. Moore
Attorney, Agent, or Firm—James M. Deimen

[57] ABSTRACT

The invention comprises a universal lockable mount to retain a Citizens Band radio or other accessory to the underside of a vehicle dashboard or to a vehicle accessory hump mount. Upper and lower portions of the mount slide together to form a box enclosing fasteners and thereby preventing access to the fasteners without first unlocking a padlock or other locking means and sliding apart the upper and lower portions. The lower portion includes depending covers to prevent access to conventional fasteners at the sides of the accessory and the accessory support bracket. The mount includes adjustable means to accommodate accessories of differing width and to permit the accessory to be adjusted to an angular position relative to the dashboard or hump mount of the vehicle.

9 Claims, 6 Drawing Figures

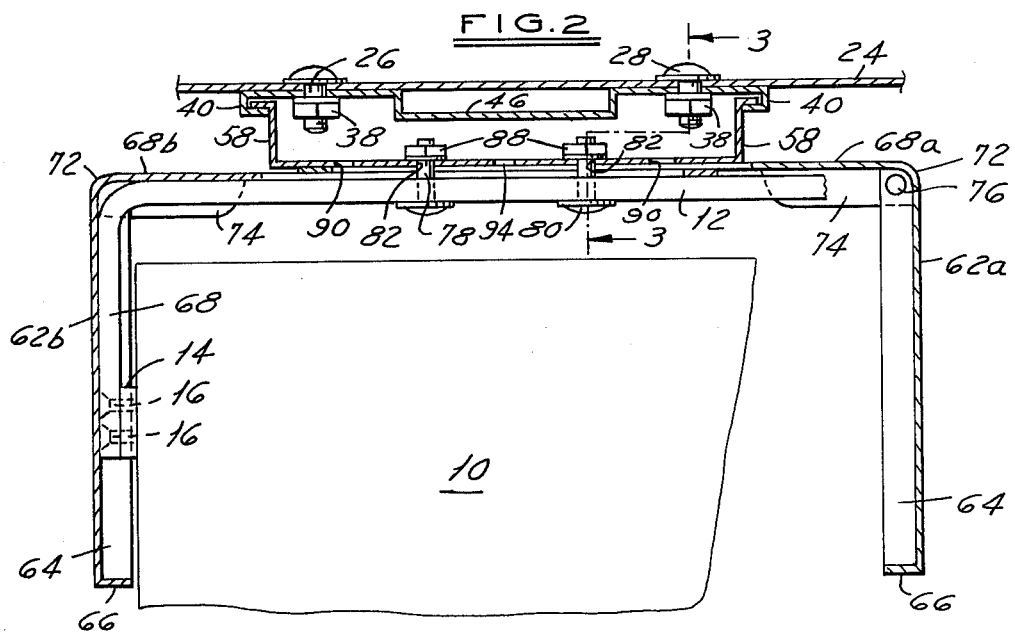
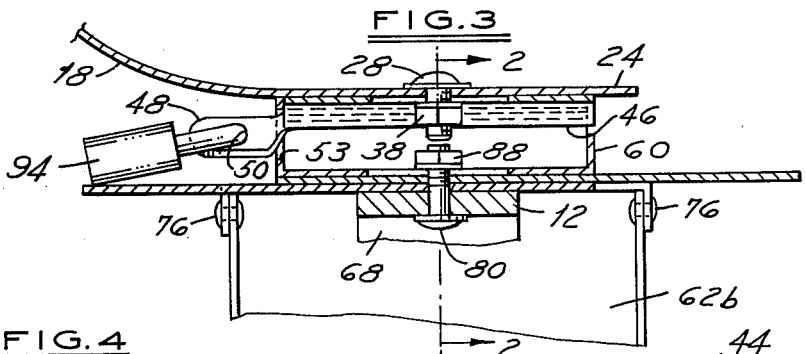
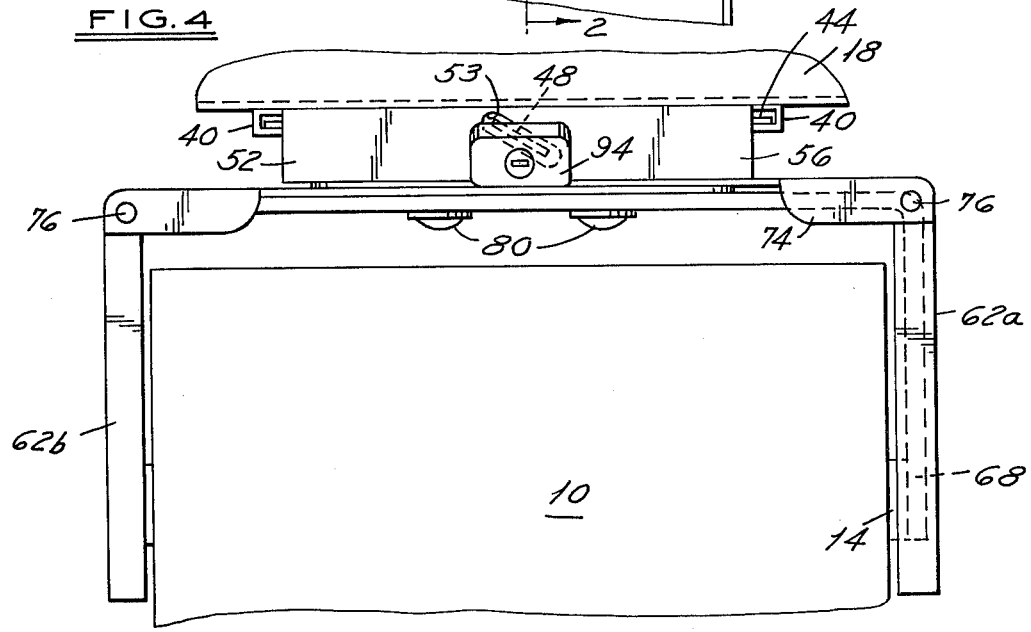

UNIVERSAL ADJUSTABLE PADLOCK MOUNT FOR VEHICLE ACCESSORIES

BACKGROUND OF THE INVENTION

A wide variety of Citizens Band radios as well as other radios and accessories are now available for attachment beneath the dashboard or on the center hump of a vehicle. Because of theft problems a wide variety of attachment means have been developed to prevent unauthorized removal of such an accessory. One form of attachment means is a lockable and slideable assembly such as is disclosed in U.S. Pat. No. 3,822,049 and which is fastened directly to the top cover of the accessory. The locking tongue means of this patent is also disclosed in U.S. Pat. No. 2,648,761. Some accessories have fastening means located on the sides of the accessory cover. U.S. Pat. No. 3,410,122 discloses lockable means to support such an accessory and prevent access to the side fastening means. U.S. Pat. No. 3,370,446 also discloses means to prevent access to side fastening means, however, neither of the latter two patents prevent access to the support of handle above the accessory and both ends of the fastening means that engage the underside of the dashboard.

SUMMARY OF THE INVENTION

The invention comprises a universal lockable and slideable Citizens Band radio and accessory mount for accessories that have a handle bracket fastened to the sides of the accessory cover. Upper and lower portions of the mount slide together to form a box preventing access to the fastener means extending from the underside of the dashboard and from the handle bracket. The mount must be unlocked and slid apart to permit such access. The lower portion includes depending covers to prevent access to the fastener means at either side of the accessory. The covers may be slid apart or together to accommodate accessories of differing width. The lower portion also includes means to permit mounting of the accessories at an angle relative to the dashboard thereby making the accessory more convenient to the operator of the vehicle.

The lock mount includes a twisted tongue positioned to permit use of a separate padlock. When locked the padlock is positioned between the lower portion of the mount and the underside of the vehicle dashboard. This position interferes with the insertion of tools to force the padlock. In an alternate embodiment the shank of a padlock replaces the tongue. When locked the body of the padlock effectively prevents the insertion of a tool to force open the lock. Thus, conventional padlocks of sturdy and proven manufacture can be effectively used with the new lock mount in a manner that inhibits or prevents forcing of the lock.

The fastening means for all the adjustable features are combined and protected by the box to prevent unauthorized access. The lock mount combines versatility with simple construction for ease of manufacture.

DESCRIPTION OF THE DRAWINGS

FIG. 2 is a front cross section of the assembled lock mount taken along the line 2 — 2 of FIG. 3;

FIG. 3 is a side cross section of the assembled lock mount taken along the line 3 — 3 of FIG. 2;

FIG. 4 is a front view of the assembled lock mount;

DESCRIPTION OF THE PREFERRED EMBODIMENTS

Figure 1:
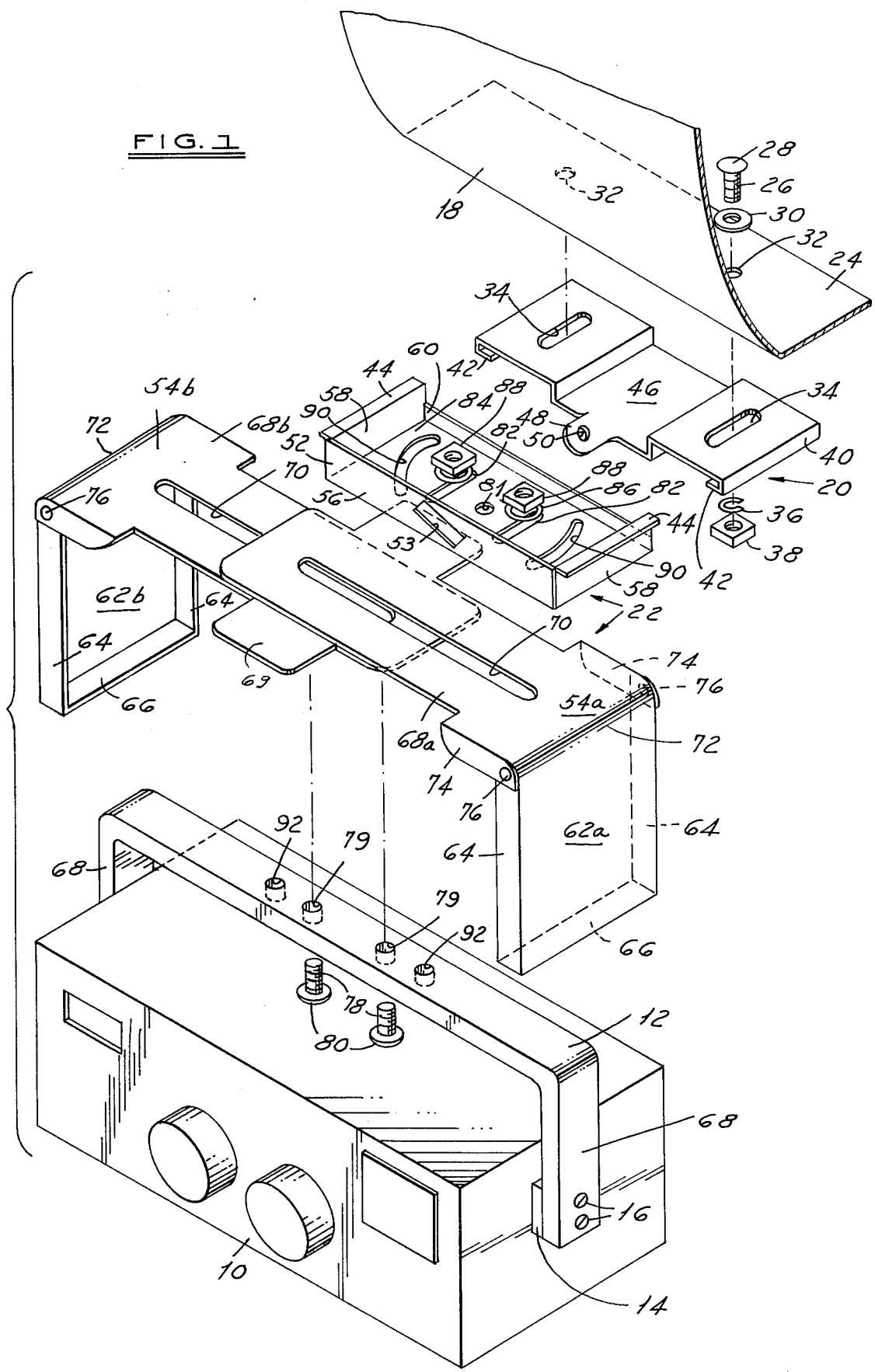
FIG. 1 is an exploded view of the lock mount.

In FIGS. 1 through 4 a Citizens Band radio or other accessory 10 includes a handle bracket 12 fastened to each side of the cover at 14 with screws 16 or other conventional fastening means. The accessory 10 is attached to a vehicle dashboard 18 by the lock mount comprising an upper portion generally denoted by 20 and a lower portion generally denoted by 22.

The upper portion 20 is securely fastened to a flange 24 or structural member beneath the dashboard with carriage bolts 26 or other fastener means having a head 28 devoid of any slot or other means to grip with a tool. Washers 30 are provided to reduce the likelihood of the bolt heads 28 being forced through the holes 32 in the flange 24. Elongated holes 34 are provided in the upper portion 20 to adjust the position of the lock mount and accessory beneath the dashboard 18 as will be more fully described below with reference to the locking means. Lockwashers 36 and nuts 38 complete the upper fastening means and are contained within the boxlike construction formed when the upper 20 and lower 22 portions are slid together. The side edges 40 of the upper portion 20 are bent under to form guide tracks 42 adapted to engage extending flanges 44 on the lower portion 22. The center 46 of the upper portion 22 is depressed and includes a tongue 48 extending forwardly therefrom and twisted obliquely with a padlock hole 50 therethrough.

The lower portion 22 comprises a box member 52 and two opposed substantially identical cover members 54a and 54b. The box member 52 includes a front 56 extending upwardly beyond the flanges 44 on the sides 58 of the box member and a back 60 limited in upward extension to clear the depressed center 46 of the upper portion 20. Thus, the upper portion 20 forms a cover for the box member 52. An oblique slot 53 in the front 56 permits the tongue 48 to extend therethrough for locking purposes when the upper 20 and lower 22 portions are assembled together.

The cover members 54a and 54b include covers 62a and 62b each having sides 64 and a bottom 66. The covers 62a and 62b are sized to enclose the vertical portions 68 of the accessory handle bracket 12, thus preventing access to the fastening means 16. The cover members 54a and 54b include extensions 68a and 68b folded perpendicular at 72 to the covers 62a and 62b. The extensions 68a and 68b include slots 70 and overlap as shown when assembled. The extensions include small side flaps 74 riveted to the sides 64 at 76 for reinforcement of the fold at 72.

The handle bracket 12 and the cover members 54a and 54b are attached to the box member 52 by carriage bolts 78 having heads 80 devoid of means to grip with a tool. The carriage bolts 78 engage holes 79 in the handle bracket, slots 70 of the cover members 54a and 54b and slots 82 in the bottom 84 of the box member 52. The carriage bolts 78 are fastened within the box member with lock washers 86 and nuts 88. The slots 70 permit the covers 62a and 62b to be extended as necessary to accommodate a variety of different accessory handle bracket 12 widths. The elongated slots 82 in the box bottom 84 permit the accessory 10 and cover members 54a and 54b to be adjusted front to back relative to the box member 52. Simultaneously a tab 69 on the extension 68b is located to support a padlock 94 in a substantially horizontal position beneath the vehicle dashboard 18. The entire lock mount and accessory can be positioned front to back by means of holes 34 to assure that the padlock is beneath the dashboard.

Curved slots 90 in the bottom 84 and auxiliary holes 92 in the handle bracket 12 provide alternate attachment of the handle bracket and cover members 54a and 54b to the box. Convenient angular positioning of the accessory about a vertical axis relative to the dashboard 18 is accomplished. Both slots 90 may be used with auxiliary holes 92 for the carriage bolt 78 attachment. Alternatively, one carriage bolt may engage hole 79 and a center hole 81 in the bottom 84 of the box member 52. The latter position allows the accessory to be mounted off center of the lock mount for clearance purposes in the confined under dashboard area of a vehicle.

As best shown in FIGS. 2 and 3 the nuts 38 and 86 are contained within the box structure of upper 20 and lower 22 portions when assembled, thus preventing any unauthorized detachment of the accessory unless the padlock 94 is first unlocked. The padlock can be any sturdy model of conventional manufacture such as a "Master" Model 510. Positioned between the tab 69 and dashboard 18, the padlock is difficult to remove because the shank 96 is behind the lock body and not accessible from above or below.

Figure 5:
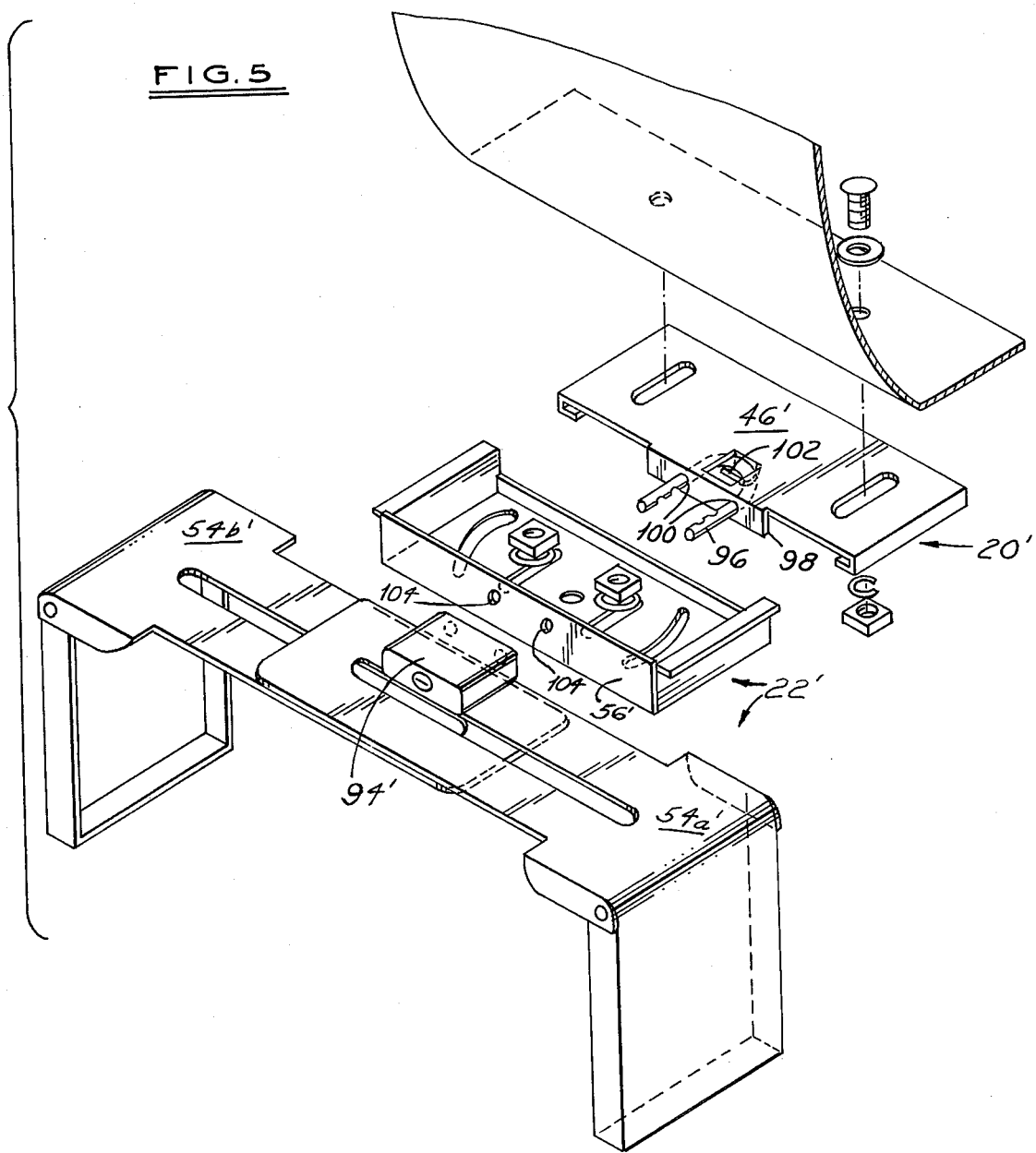
FIG. 5 is an exploded view of an alternative form of the lock mount.
Figure 6:
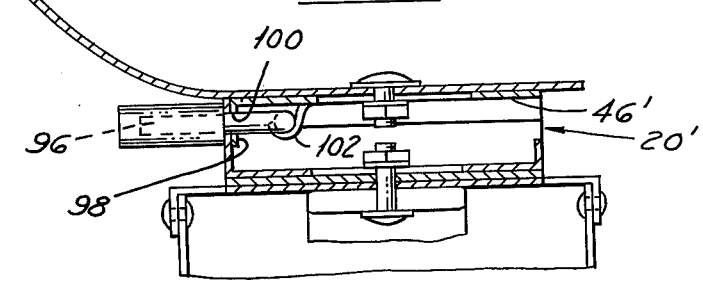
FIG. 6 is a side cross section of the alternative lock mount at FIG. 5 as assembled.

In FIGS. 5 and 6 an alternative form of the lock mount is shown. The upper portion 20' is modified to retain the shank 96 of a padlock 94 such as the "Master" Model 510. The center portion 46' includes a flange 98 perpendicularly depending therefrom and having two holes 100 to retain the shank 96. A clip 102 also engages the curved portion of the shank 96 and is formed from the center portion 46'. Matching holes 104 are formed in the front 56' of the lower portion 22' to accommodate the shank 96 as the two portions are slid together. This construction retains the padlock 94' rigidly in place to prevent rattling and simultaneously prevents access to the shank 96 when locked as best shown in FIG. 6. The lock supporting tab 69 of the first embodiment above is not necessary and therefore is deleted from cover members 54a' and 54b'.

I claim:

1. In an improved mount for detachably fastening an accessory to a vehicle, including, an upper portion having means for attachment to a vehicle, a lower portion slideably engageable with the upper portion, the lower portion including a box member and two opposed cover members, means for attaching a lock to retain the upper and lower portions in engagement and means for attaching an accessory to the lower portion, the improvement comprising, overlapping extensions on the cover members, parallel slots in the extensions, at least two slots in the box member non-parallel to the slots in the extensions and adjustable fastening means extending through the slots in the extensions and the slots in the box member thereby permitting firstly, adjustment of the distance between the cover members and secondly, the box member position relative to both the cover members.

2. The improved mount according to claim 1 wherein at least one box member slot is curved.

3. The improved mount according to claim 2 including a central pivot hole in the box member.

4. The improved mount according to claim 1 wherein the box member includes two curved slots and two parallel straight slots.

5. The improved mount according to claim 1 wherein the box member includes a front and an oblique slot in the front and wherein a twisted tongue extends from the upper portion and is adapted to extend through the oblique slot upon full engagement of the upper and lower portions.

6. The improved mount according to claim 1 wherein the box member includes a front and at least one hole in the front and wherein a flange extends from the upper portion, the flange including at least one hole adapted for alignment with the front hole when the upper and lower portions are fully engaged.

7. The improved mount according to claim 1 wherein the upper portion includes means to retain the shank of a padlock thereto and the box member includes means to engage the shank of a padlock.

8. The improved mount according to claim 7 wherein the means to engage the shank of a padlock comprise a front on the box member and at least one hole in the front.

9. The improved mount according to claim 7 wherein the means to retain the shank of a padlock rigidly affix the shank to the upper portion.

* * * * *